Feb. 19, 1924.  1,484,602
C. M. CHAPMAN
STOCK FEEDING MECHANISM
Filed Aug. 19, 1920    2 Sheets-Sheet 1
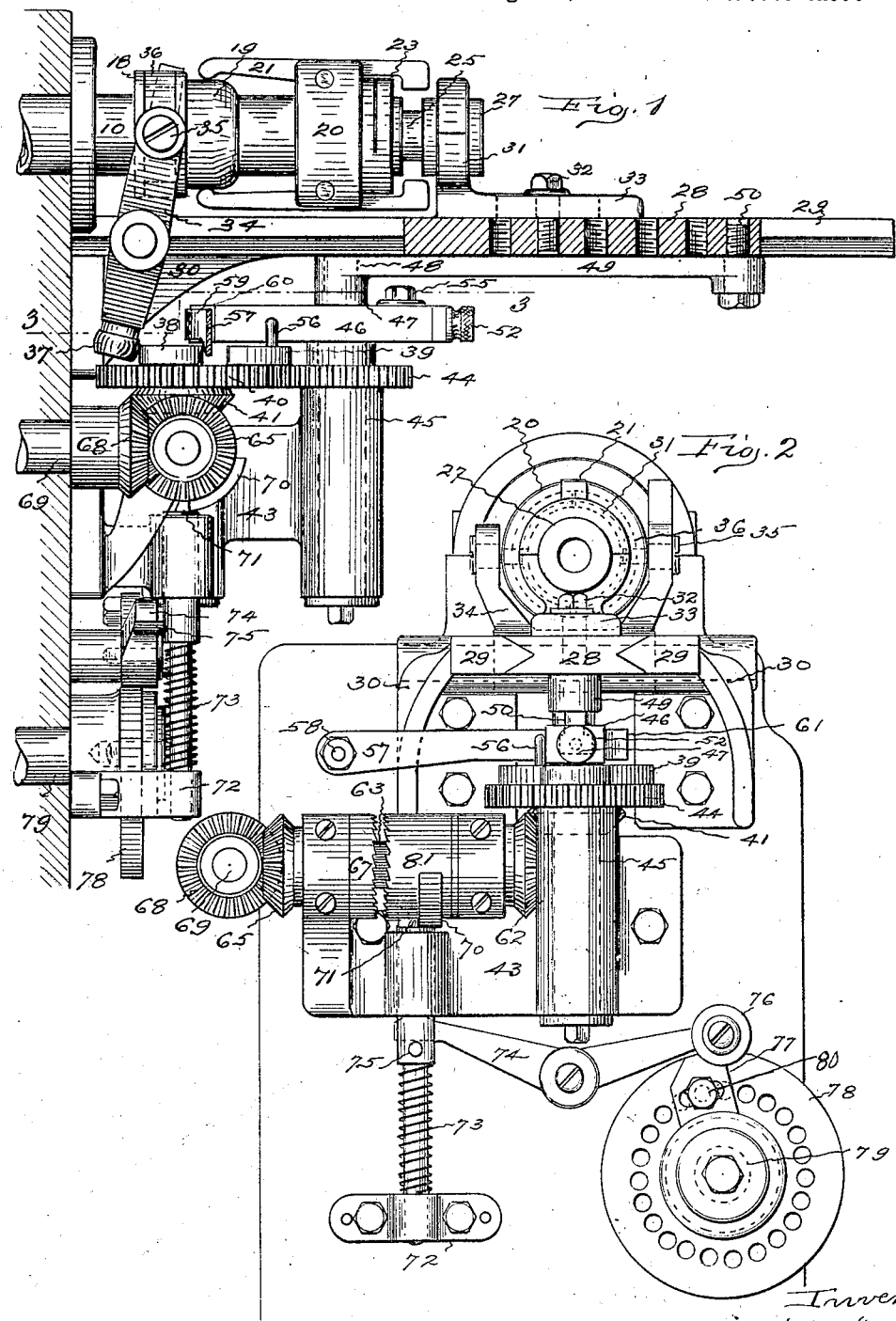

Feb. 19, 1924.
C. M. CHAPMAN
STOCK FEEDING MECHANISM
Filed Aug. 19, 1920
1,484,602
2 Sheets-Sheet 2
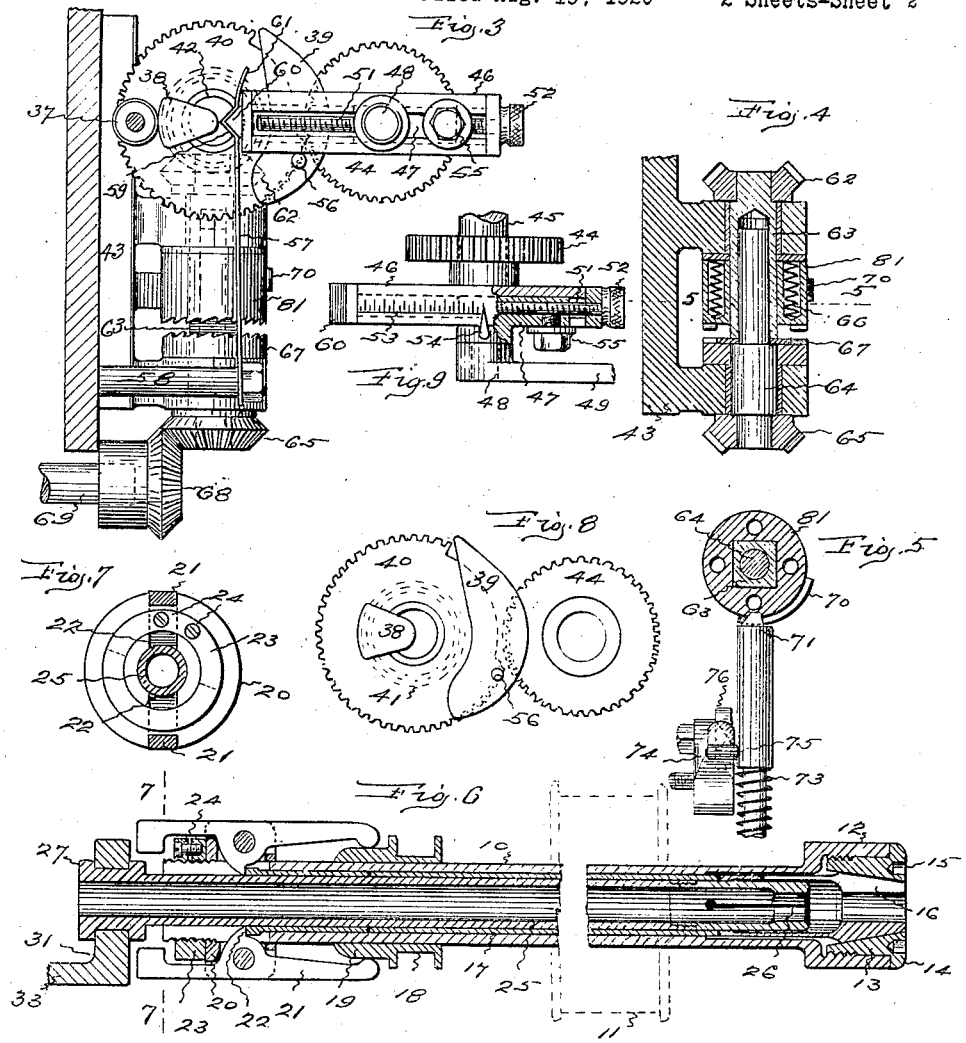

Patented Feb. 19, 1924.

1,484,602

UNITED STATES PATENT OFFICE.

CLARENCE M. CHAPMAN, OF TERRYVILLE, CONNECTICUT, ASSIGNOR TO THE CHAPMAN MACHINE COMPANY, OF PLYMOUTH, CONNECTICUT, A CORPORATION OF CONNECTICUT.

STOCK-FEEDING MECHANISM.

Application filed August 19, 1920. Serial No. 404,628.

*To all whom it may concern:*

Be it known that I, CLARENCE M. CHAPMAN, a citizen of the United States, residing at Terryville, in the county of Litchfield and State of Connecticut, have invented a new and useful Improvement in Stock-Feeding Mechanism, of which the following is a specification.

This invention relates to a mechanism that is particularly adapted for feeding wire, rod or bar stock to the forming tools of an automatic lathe or screw machine, although it is applicable to other types of metal forming machines in which the stock is intermittently fed through rotatory tubular spindles to operating tools.

The object of the invention is to provide a stock feeding mechanism for machines of this class which is simple in construction, easily adjusted for feeding stock of different sizes for various distances, operates smoothly at high speeds, feeds with extreme accuracy and retains the stock securely in exact position while the tools are cutting.

This object is attained by adjustably connecting the feed quill which is longitudinally movable in the tubular spindle containing the feed chuck and holding chuck, to a slide that is reciprocated by an intermittently operated crank mechanism which starts the feed from rest, gradually accelerates the feed for one-half of the distance, and then gradually retards the feed to rest, where it becomes locked and held in exact position until time for returning and making a subsequent feed of the stock, the crank throw being adjustable for varying the length of feed, the control for the crank revolving mechanism being adjustable for altering the time of feed and for causing a feed as many times as desired during each cycle of the machine to which the mechanism is applied, and the holding chuck being controlled by mechanism actuated from the crank revolving mechanism so as to ensure exact synchronism in all of the movements. Other details such as a renewable chuck closing nose, a split clamp nut for adjusting the relation of the chuck jaws and the closing nose, and counterbalanced chuck closing fingers constructed to automatically eliminate the liability of holding the chuck closed under centrifugal action at high speeds, assist in attaining the object of the invention.

In the accompanying drawings Fig. 1 shows a rear elevation of a mechanism which embodies the invention with the spindle broken off. Fig. 2 shows an end elevation of the mechanism. Fig. 3 shows a horizontal section taken on the dotted line 3—3 on Fig. 1 and looking downward. Fig. 4 shows a horizontal section taken through the clutch and bevel driving and driven gears. Fig. 5 shows a vertical section through the clutch and clutch locking and releasing bolt, taken on plane 5—5 on Fig. 4. Fig. 6 shows a longitudinal section of the spindle containing the feed and holding chucks. Fig. 7 shows a transverse section of the spindle on plane indicated by dotted line 7—7 on Fig. 6. Fig. 8 is a plan of the cams which cause the operation of the holding chuck opening and closing means and the spur driving and driven gears which revolve the crank. Fig. 9 is a side view with part broken away of the feed crank and link turned over showing the scale and pointer provided to gauge the feed adjustment.

The tubular spindle 10 of the mechanism illustrated as embodying the invention is designed to be rotarily mounted in suitable bearings on the frame of the machine with which it is to be used, and may be provided with a pulley 11 by means of which it can be rotated at the required speed. At the chuck end the spindle has a head 12 with a cylindrical bore that is threaded near the bottom. In the head is a renewable chuck nose 13 of hard metal. This nose has a cylindrical section that fits the interior of the head with a thread at the inner end that screws into the threaded wall, and a flange 14 that sets against the end of the head. Sockets 15 are provided for the application of a spanner wrench for turning the nose into and out of position. The inner wall of the nose is inwardly tapered and cooperates with the outwardly tapering outer surfaces of the spring jaws of the stock holding chuck 16 for closing the jaws upon the stock to be operated upon, when the holding chuck is pushed forward by the chuck tube 17 that has a limited longitudinal movement in the spindle and bears against the inner end of the holding chuck. The removable nose provides for the ready renewing of the part that is subjected to severe wear without affecting the accuracy of the spindle.

Longitudinally movable upon the spindle is a spool 18 with a conical wedge 19. Set upon the spindle is a collar 20 and pivotally held in slots in the collar are fingers 21, the forward ends of which are designed to be engaged and separated by the conical wedge. On the inner edges of the fingers are teeth 22 that extend into longitudinal slots in the spindle and bear against the rear end of the chuck tube so as to push the tube forward and cause the closing of the holding chuck jaws when the fingers are separated by the wedge. The fingers extend rearwardly of their pivots and the rear ends are weighted so that they will overcome the tendency of the forward ends to fly apart or remain outward under centrifugal action when the spindle is rotated at high speed, and thus without the employment of any spring relieve the pressure of the teeth against the tube and ensure the release of the holding chuck jaws on the stock. A nut 23 is screwed upon the end of the spindle to hold the collar with the fingers in correct position, and this nut is transversely slitted and provided with two screws 24, either one of which may be employed to clamp the nut in the position to which it is adjusted on the spindle.

The feed quill 25 is longitudinally movable in the holding chuck tube. Removably secured to the forward end of the feed quill is a spring jaw chuck 26 and on the rear end of the quill is a spool 27. A slide 28 with V-shaped grooves in its edges is movable longitudinally back and forth in a guideway in the table 29 that extends horizontally from brackets 30 which are designed to be fastened to the end wall of the frame of the machine with which the mechanism is to be used. Mounted on this slide is a yoke 31 which engages the spool on the end of the feed quill. The yoke is attached to the slide by a screw bolt 32 that passes through the foot 33 of the yoke and into a threaded hole in the slide, there being several threaded holes to permit the position of the yoke with relation to the slide to be changed, as may be necessary when the travel of the slide is altered.

Pivotally mounted on the table brackets is a lever 34. The upper end of this lever is forked and provided with screw pivots 35 that are engaged with shoes 36 lying in the groove in the wedge spool 18 that slides upon the spindle for spreading the fingers and closing the holding chuck. The lower end of this forked lever bears a roll 37 which is adapted to be engaged for oscillating the lever by cams 38 and 39 secured to the upper face of a spur gear 40. These cams are designed to cause the holding chuck to close and release at the proper time. On the under face of the spur gear 40 is a bevel gear 41, these gears and cams being mounted on a shaft 42 held vertically in bearings in a bracket 43 that is designed to be bolted to the end wall of the machine.

Designed to mesh with the spur gear 40 is a spur gear 44 attached to a shaft 45 mounted in bearings in the bracket 43. Attached to the shaft 45 is a crank bar 46. This crank bar has in one side a longitudinally extending T-shaped slot, fitted in and movable along which is a block 47 provided with a stud 48. A link 49 connects the stud 48 on the crank block with a screw stud 50 projecting downward from the feed slide. Extending longitudinally through the slot in the crank bar and T-shaped block carried therein, is a screw 51 with a knurled head 52. By means of this screw the crank block may be accurately adjusted any distance along the bar to obtain the necessary eccentricity for providing the required feed of the slide. On one side of the crank bar is a scale 53 with the desired graduations, and attached to the crank block is a pointer 54 that, registering with the scale, indicates the adjustment of the crank block and consequently the amount of travel of the feed slide. When the crank block has been adjusted it is secured in place by the clamp screw 55.

A portion of the teeth on the periphery of the spur gear 40 are omitted so that at the desired time the spur gear 40 will be out of mesh with the spur gear 44 and cause a dwell in the crank movement. In order to re-engage the teeth of these gears a pin 56 is set in the cam 39 in position to engage the crank bar and drive it until such time as the teeth of these gears mesh. A long leaf spring 57 is mounted on a post 58 attached to the wall of the machine and projected in such manner that a V-shaped bend 59 near its free end will engage with an angular projection 60 on the end of the crank bar for the purpose of retaining the bar in exact position when the gear teeth are disengaged. The end 61 of this spring is slightly curved around the end of the crank bar so that it will prevent the crank bar from jumping past the position in which it is to be held.

The bevel gear 41 on the under side of the cam bearing spur gear 40 is engaged by a bevel gear 62 fastened to the end of a tubular arbor 63 that is supported by a bearing on the bracket 43. Turning in this arbor and supported by a bearing on the bracket is an arbor 64 bearing a bevel gear 65, Fig. 4. A section of the arbor 63 may be made angular, and longitudinally movable on this section is a clutch member 81 that by springs 66 is designed to be thrust toward a clutch member 67 that is secured to the arbor 64. The bevel gear 65 is designed to be engaged by a bevel gear 68 which is secured to the end of a constantly rotating drive shaft 69 of the machine to which the feed mechanism is attached. When the clutch members are engaged the bevel gears cause the rotation of the spur gears which through the cams and forked lever cause the required actuation of the holding chuck, and through the crank and slide give the feed and return motions to the feed quill.

On the movable section 81 of the clutch is a cam 70 and at certain periods this cam is engaged by a vertically movable bolt 71 in such manner that the movable section is drawn against the pressure of the springs and the clutch disengaged and held so. The upper end of this bolt is carried by a bearing on the bracket 43, its lower end being guided by a bracket 72, and it is normally thrust upward by a spring 73. When the bolt is drawn downward the cam is released and the springs in the movable section of the clutch throw it outward so as to cause engagement between the driving and driven members of the clutch. The upper end of the bolt which is slightly beveled, when it has engaged the cam and the movable member of the clutch is pushed back, enters a socket in the movable clutch member for positioning and locking it in place, Fig. 5.

A lever 74 pivoted to the side wall of the machine frame has one arm engaging a pin 75 projecting from the clutch locking bolt. On the other end of this lever is a roll 76 that is designed to be engaged by a trip dog 77 mounted on a disk 78 that is attached to a shaft 79 which is constantly rotated from the machine. The trip dog is held to the disk by a clamp screw 80 that passes through a slot in the dog into a hole in the disk, there being a number of these holes arranged around the disk so that the dog may be located in different positions. Should it be desired to draw down the locking bolt and release the clutch member so that the clutch will engage and operate the mechanism more than once during each cycle of the machine or rotation of the trip disk, the necessary number of trip dogs may be located on the disk for operating the mechanism the desired number of times.

With this mechanism an ideal motion is imparted to the stock feed and consequently the machine to which it is attached can be run at high speed. Exact adjustments can be made and the stock fed very accurately without the employment of the usual stock stop.

The invention claimed is:

1. A stock feeding mechanism comprising a spindle containing a holding chuck and feed chuck, means for opening and closing the holding chuck, a slide, means adjustably attached to the slide for transmitting the movements of the slide to the feed chuck, a crank, a connection between the crank and slide, mechanism for actuating said holding-chuck closing-means, and intermeshing gears for intermittently rotating the crank, driven by the mechanism which actuates said chuck-closing means, whereby the actions of the chuck are co-ordinated.

2. A stock feeding mechanism comprising a spindle containing a holding chuck and feed chuck, means for opening and closing the holding chuck, a slide, means adjustably attached to the slide for transmitting the movements of the slide to the feed chuck, a crank, a link with one end adjustably connected with the crank and the other end attached to the slide, mechanism for actuating said holding-chuck closing-means, and intermeshing gears for intermittently rotating the crank, driven by the mechanism which actuates said chuck-closing means, whereby the actions of the chucks are co-ordinated.

3. A stock feeding mechanism comprising a spindle containing a holding chuck and feed chuck, means for opening and closing the holding chuck, a slide, means adjustably attached to the slide for transmitting the movements of the slide to the feed chuck, a crank, means for adjusting the eccentricity of the crank, a link with one end pivoted to the crank and the other end pivoted to the slide, mechanism for actuating said holding-chuck closing-means and intermeshing gears for intermittently rotating the crank driven by the mechanism which actuates said chuck-closing means.

4. A stock feeding mechanism comprising a spindle containing a holding chuck and feed chuck, means for opening and closing the holding chuck, a slide, an adjustable connection between the feed chuck and slide for transmitting the movements of the slide to the feed chuck, a crank, an adjustable connection between the crank and slide, mechanism for actuating said holding-chuck closing-means, and intermeshing gears for intermittently rotating the crank, driven by the mechanism which actuates said chuck closing-means.

5. A stock feeding mechanism comprising a spindle containing a holding chuck and feed chuck, means for opening and closing the holding chuck, a slide connected with the feed chuck, a crank, an adjustable connection between the crank and slide, mechanism for intermittently rotating the crank, and means for locking the crank between rotations.

6. A stock feeding mechanism comprising a spindle containing a holding chuck and feed chuck, means for opening and closing the holding chuck, a slide connected with the feed chuck, a crank bar, a crank block adjustably mounted on the crank bar, a link connection between the crank block and slide, mechanism for intermittently rotating the crank bar, and a spring for locking the crank bar between rotations.

7. A stock feeding mechanism comprising a spindle containing a holding chuck and feed chuck, means for opening and closing the holding chuck, a slide, means adjustably attached to the slide for transmitting the movements of the slide to the feed chuck, a crank bar, a crank block adjustably mounted in said bar, a screw for adjusting the crank block, a link with one end pivoted to the crank block and the other end pivoted to the slide, and intermeshing gears for actuating said holding-chuck closing-means and rotating the crank bar.

8. A stock feeding mechanism comprising a spindle containing a holding chuck and feed chuck, means for opening and closing the holding chuck, a slide, means adjustably attached to the slide for transmitting the movements of the slide to the feed chuck, a crank bar, a crank block adjustably mounted in said bar, a screw for adjusting the crank block, means for locking the crank block, a link with one end pivoted to the crank block and the other end pivoted to the slide, and intermeshing gears for actuating said holding-chuck closing-means and rotating the crank bar.

9. A stock feeding mechanism comprising a spindle containing a holding chuck and feed chuck, means for opening and closing the holding chuck, means for reciprocating the feed chuck, and intermeshing spur gears, one of said gears bearing cams for actuating said holding chuck means and the other being connected with said feed chuck reciprocating means.

10. A stock feeding mechanism comprising a spindle containing a holding chuck and feed chuck, means for opening and closing the holding chuck, means for reciprocating the feed chuck, and intermeshing driving and driven gears, one of which is connected with said feed chuck reciprocating means and the other has a few teeth omitted and bears cams for actuating said holding chuck means and a pin for rotating the gears into mesh after disengagement.

11. A stock feeding mechanism comprising a spindle containing a holding chuck and feed chuck, means for opening and closing the holding chuck, means for reciprocating the feed chuck, intermeshing spur gears, one of which is connected with said feed chuck reciprocating means and the other has a few teeth omitted and bears cams for actuating said holding chuck means and a pin for rotating the gears into mesh after disengagement, and a spring finger for retaining the first mentioned gear in position when the gears are disengaged.

12. A stock feeding mechanism comprising a spindle containing a holding chuck and a feed chuck, a holding chuck tube, fingers engaging the holding chuck tube for closing the chuck, a wedge for separating said fingers, a forked lever for operating said wedge, a feed chuck quill, a slide connected with said quill, a crank connection for reciprocating the slide, intermeshing spur gears, one of which is connected with the crank and the other bears cams for operating said forked lever, and mechanism for intermittently rotating said gears.

13. A stock feeding mechanism comprising a spindle containing a holding chuck and a feed chuck, a holding chuck tube, fingers engaging the holding chuck tube for closing the chuck, a wedge for separating said fingers, a forked lever for operating said wedge, a feed chuck quill, a slide connected with said quill, a crank connection for reciprocating the slide, intermeshing spur gears, one of which is connected with the crank and the other bears cams for operating said forked lever, mechanism for rotating said gears, a clutch for rendering active and inactive said gear rotating mechanism, springs for engaging said clutch, a wedge and spring bolt for disengaging said clutch, a lever controlling said bolt, and adjustable dogs for actuating said lever.

14. A stock feeding mechanism comprising a spindle containing a holding chuck and a feed chuck, a holding chuck tube, fingers engaging the holding chuck tube for closing the chuck, a wedge for separating said fingers, a forked lever for operating said wedge, a feed chuck quill, a slide connected with said quill, a crank connection for reciprocating the slide, intermeshing spur gears, one of which is connected with the crank and the other bears cams for operating said forked lever, mechanism for rotating said gears, a clutch for rendering active and inactive said gear rotating mechanism, springs for engaging said clutch, a rotary wedge and spring bolt for disengaging the clutch, a trip lever engaging said bolt, and a disk with a trip dog for engaging said lever.

15. A stock feeding mechanism comprising a spindle containing a holding chuck and a feed chuck, a holding chuck tube, fingers engaging the holding chuck tube for closing the chuck, a wedge for separating said fingers, a forked lever for operating said wedge, a feed chuck quill, a slide connected with said quill, a crank connection for reciprocating the slide, intermeshing spur gears, one of which is connected with the crank and the other bears cams for operating said forked lever, mechanism for rotating said gears, a clutch for rendering active and inactive said gear rotating mechanism, springs for engaging said clutch, a rotary wedge and spring bolt for disengaging the clutch, a trip lever engaging said bolt, and a perforated disk and trip dog adjustably attached thereto for engaging said lever.

16. In a stock feeding mechanism the combination with the feeding chuck, quill and slide, of a crank bar, a crank block mounted on said bar and connected with the slide, a screw for adjusting the eccentricity of said block, and means for intermittently rotating said crank bar.

17. In a stock feeding mechanism the combination with the feeding chuck, quill and slide, of a crank bar bearing an index scale, a crank block mounted on said bar and bearing an index pointer, a screw for adjusting the eccentricity of said block, and means for intermittently rotating said crank bar.

18. In a stock feeding mechanism the combination with the feeding chuck, quill and slide, of a crank, a link connecting the crank and slide, a gear connected with the crank, and a mutilated gear and pin for intermittently rotating the crank gear.

19. In a stock feeding mechanism the combination with the holding and feeding chucks and mechanism for actuating said chucks, of a driving clutch member, a driven clutch member, springs for engaging the clutch members, a wedge carried by the driven clutch member, a bolt adapted to engage said wedge and cause the disengagement of the clutch members, and means for intermittently reciprocating the bolt into and out of the path of said wedge.

20. In a stock feeding mechanism the combination with the holding and feeding chucks and mechanism for actuating said chucks, of a driving clutch member, a driven clutch member, springs for engaging the clutch members, a wedge carried by the driven clutch member, a spring bolt adapted to engage said wedge and cause the disengagement of the clutch members, a lever for withdrawing said bolt from the driven clutch member, and a trip disk adapted to intermittently engage said lever.

21. In a stock feeding mechanism the combination with the holding and feeding chucks and mechanism for actuating said chucks, of a driving clutch member, a driven clutch member, springs for engaging the clutch members, a wedge carried by the driven clutch member, a spring bolt adapted to engage said wedge and enter a socket in the driven clutch member for separating the clutch members and holding the driven clutch member, and means for intermittently reciprocating the bolt.

22. In a stock feeding mechanism the combination with the feeding chuck, quill and slide, of a crank bar having a retaining tooth at one end and carrying a crank block and screw for adjusting the crank block, a link connecting the crank block with the feed slide, a spring with a recessed end adapted to engage said retaining tooth and hold the crank bar in position, and mechanism for intermittently rotating the crank bar.

23. The combination with a feed spindle containing a feed chuck, feed chuck quill, holding chuck and holding chuck tube, of a collar set upon the spindle, fingers pivoted to the collar and bearing against the holding chuck tube, a sliding wedge adapted to separate said fingers, a split nut threaded upon the spindle back of said collar, and screws for clamping the nut in the position to which it is adjusted.

24. The combination with a feed spindle containing a feed chuck, feed chuck quill, holding chuck and holding chuck tube, of a removable nose located in a recess in the head at the chuck end of the spindle, said nose having an inwardly tapered inner wall, a cylindrical outer wall with a thread fitting a threaded section of the inner wall of the head of the spindle, and a flange at the outer end of the nose seated against the end of the head.

25. The combination with a feed spindle containing a feed chuck, feed chuck quill, holding chuck and holding chuck tube, of a collar set upon the spindle, fingers pivotally mounted on said collar and bearing against the holding chuck tube, a sliding wedge adapted to separate said fingers, and counter balancing means applied to said fingers whereby centrifugal action will tend to cause the fingers to move toward each other.

CLARENCE M. CHAPMAN.